United States Patent
Garvin

(10) Patent No.: US 6,644,524 B1
(45) Date of Patent: Nov. 11, 2003

(54) SHOPPING CART HAVING CUPHOLDER

(75) Inventor: Randy Garvin, Wagoner, OK (US)

(73) Assignee: Unarco Industries, Inc., Wagoner, OK (US)

( * ) Notice: Subject to any disclaimer, the term of this patent is extended or adjusted under 35 U.S.C. 154(b) by 0 days.

(21) Appl. No.: 10/225,926

(22) Filed: Aug. 22, 2002

(51) Int. Cl.[7] .............................................. B60R 7/00
(52) U.S. Cl. ..................... 224/411; 224/926; 248/311.2; 280/33.992
(58) Field of Search ................................ 224/407, 409, 224/411, 926; 248/311.2, 313; 280/33.992; D7/620

(56) References Cited

U.S. PATENT DOCUMENTS

| | | | | |
|---|---|---|---|---|
| 2,633,278 A | * | 3/1953 | Muniz | 280/33.992 |
| 2,645,392 A | * | 7/1953 | Gottsegen et al. | 224/926 |
| 4,596,370 A | * | 6/1986 | Adkins | D7/620 |
| 4,852,843 A | * | 8/1989 | Chandler | 224/926 |
| 5,012,966 A | * | 5/1991 | Turner et al. | 224/411 |
| 5,244,175 A | * | 9/1993 | Frankel | 248/311.2 |
| 5,362,077 A | | 11/1994 | Adamson | |
| 5,494,306 A | | 2/1996 | Adamson et al. | |
| D383,284 S | * | 9/1997 | Lines | D7/620 |
| 5,695,162 A | | 12/1997 | DiCastro | |
| 5,709,429 A | | 1/1998 | Bergin | |
| D398,127 S | | 9/1998 | Bergin et al. | |
| 5,938,091 A | | 8/1999 | Bergin et al. | |
| D425,012 S | | 5/2000 | Bergin | |
| 6,231,058 B1 | | 5/2001 | Kimborough et al. | |

* cited by examiner

*Primary Examiner*—Gary E. Elkins
(74) *Attorney, Agent, or Firm*—Wood, Phillips, Katz, Clark & Mortimer

(57) ABSTRACT

In a shopping cart, in which structures are movable between a first set of relative positions, in which a child seat is defined by the movable structures, and a second set of relative positions, in which the shopping cart is adapted to receive a similar cart nesting into the shopping cart, a cupholder comprises a cup-holding body mounted to one of the movable structures so that the cup-holding body occupies a portion of the child seat in the first set of relative positions. The body is made from a rubbery material enabling the body to collapse to a collapsed condition, in which the body, if empty, does not prevent nesting of a similar cart into the shopping cart, and to return to an uncollapsed condition, in which the body can hold a cup.

20 Claims, 2 Drawing Sheets

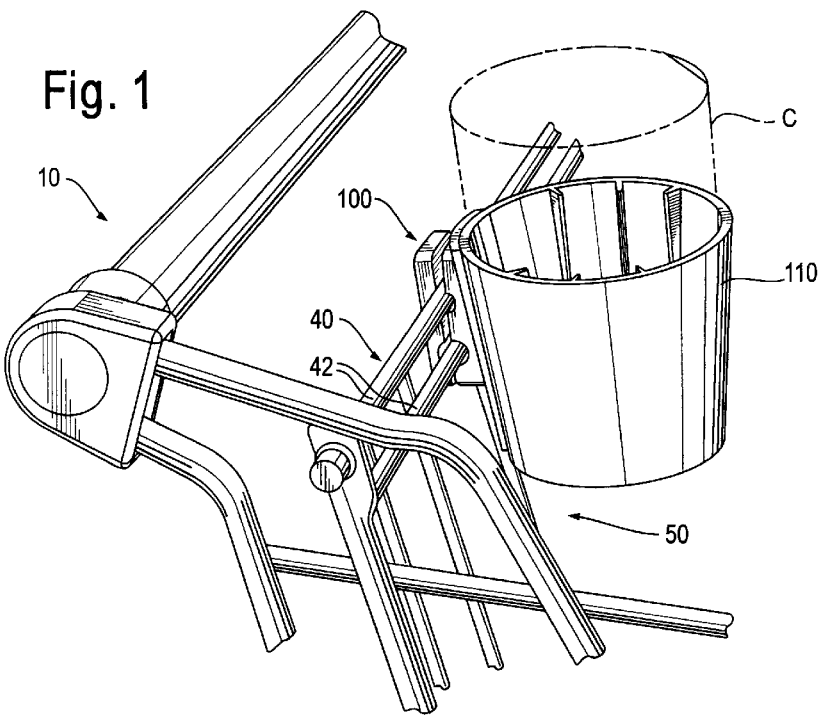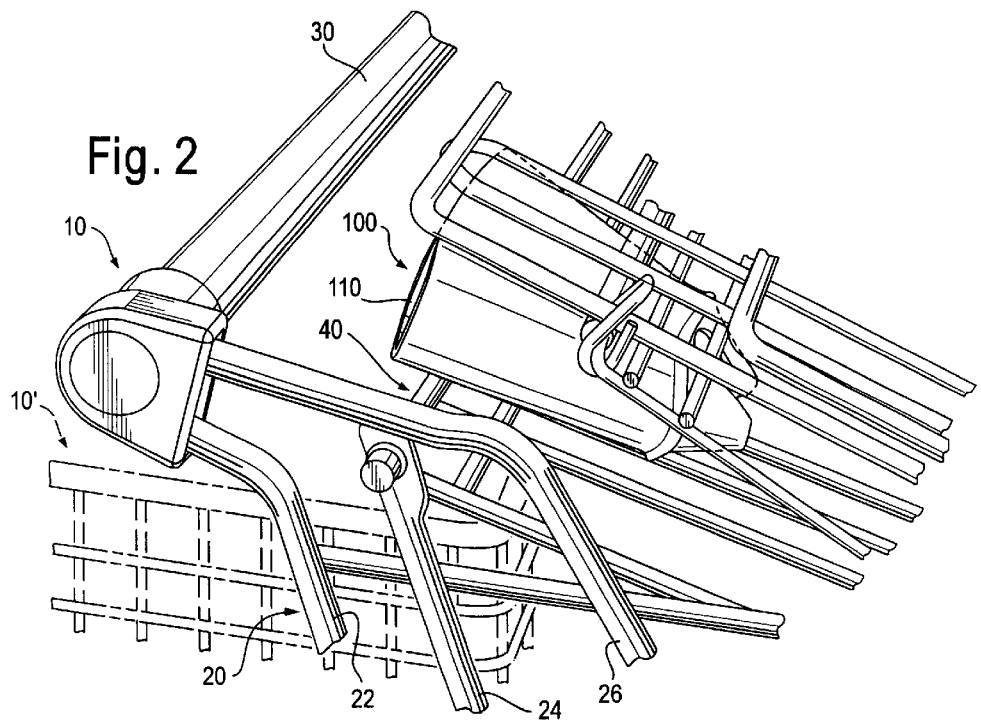

US 6,644,524 B1

SHOPPING CART HAVING CUPHOLDER

TECHNICAL FIELD OF THE INVENTION

This invention pertains to a shopping cart equipped with a cupholder, which projects into the shopping cart. The cupholder has a collapsible, cup-holding body, which, if empty, does not prevent nesting of a similar cart into the shopping cart equipped with the cupholder.

BACKGROUND OF THE INVENTION

As exemplified in U.S. Pat. No. 5,362,077 and U.S. Pat. No. 5,494,306, it is known to mount a cupholder to a transverse handle of the shopping cart. The cupholders exemplified therein employ metal cup-holding elements. As exemplified in U.S. Pat. No. 5,938,091 and U.S. Pat. No. 6,231,058, it is known to mount a cupholder so as to project into a shopping cart.

As exemplified in U.S. Pat. No. 5,938,091, supra, and in U.S. Pat. No. 5,695,162, it is known to make a cupholder from a polymeric material. The cupholder exemplified in U.S. Pat. No. 5,695,162 is mountable to a stadium or arena seat, at a bottom wall of the cupholder, and is deformable.

SUMMARY OF THE INVENTION

This invention provides a shopping cart comprising structures movable between a first set of relative positions, in which a child seat is defined, and a second set of relative positions, in which the shopping cart is adapted to receive a nesting cart. Those structures, which are conventional in a shopping cart, may include wire panels, polymeric panels, or both. Those structures include a gate pivotable between a lowered position, in which the gate is positioned in the first set of relative positions of the movable structures, and an elevated position, in which the gate is positioned in the second set of relative positions of the movable structures. This invention contemplates that the cupholder comprises a cup-holding body, which is mounted to one of the movable structures, such as the gate, so that the cup-holding body projects into the shopping cart, where the child seat is defined, in the first set of relative positions of the planar structures.

This invention contemplates that the cup-holding body is made from a rubbery material enabling the cup-holding body to collapse to a collapsed condition, in which the cup-holding body, if empty, does not prevent nesting of a similar cart into the shopping cart having the cupholder, and enabling the cup-holding body to return to an uncollapsed condition, in which the cup-holding body can hold a cup.

Preferably, the cup-holding body has a lateral wall, which can assume a frusto-conical shape when not collapsed. Preferably, moreover, the cup-holding body has two sets of fins projecting inwardly from the lateral wall so as to be diametrically opposed when the lateral wall assumes the frusto-conical shape. Preferably, each fin has an upper end and a lower end and tapers between the upper end, which projects more from the lateral wall, and the lower end, which projects less from the lateral wall. Preferably, the cup-holding body has two partial, lower walls spaced from each other by a gap, which facilitates collapsing of the cup-holding body and through which any spilled contents can drain from the cup-holding body.

Preferably, the structure mounting the cup-holding body comprises horizontal wires and the shopping cart further comprises a rigid part affixed to the lateral wall of the cup-holding body and positioned on a given side of said wires, a rigid part positioned on an opposite side of said wires, and means for fastening the rigid parts to each other with said wires clamped between the rigid parts. At least one of the rigid parts may be thus recessed so as to accommodate said wires and, preferably, both rigid parts are recessed so as to accommodate said wires.

BRIEF DESCRIPTION OF THE DRAWINGS

FIGS. 1 and 2 are fragmentary, perspective views of a shopping cart equipped with a cupholder, in a preferred embodiment of this invention. In FIG. 1, a cup-holding body of the cupholder is illustrated in an uncollapsed condition, in which the cup-holding body is adapted to receive a cup, such as the cup illustrated in broken lines. In FIG. 2, in which a similar cart is illustrated in broken lines as being nested into the shopping cart equipped with the cupholder, the cup-holding body is illustrated in a collapsed condition, in which the cup-holding body, if empty, does not prevent nesting of the similar cart thereinto.

FIG. 3 is a perspective view. FIGS. 4, 5, and 6 are elevations of the cupholder, which are taken from different vantages. FIG. 6 illustrates two screws, which are employed when the cupholder is mounted to the shopping cart. FIG. 7 is an upper plan of the cupholder.

DETAILED DESCRIPTION OF THE ILLUSTRATED EMBODIMENT

Figure 3:
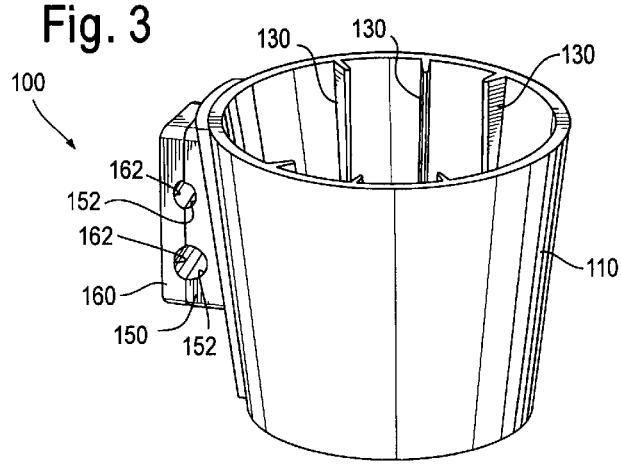
FIGS. 3 through 7 are views of the cupholder, apart from the shopping cart.

As illustrated in FIGS. 1 and 2, a shopping cart 10 having a conventional construction is equipped with a cupholder 100, in a preferred embodiment of this invention. As illustrated in FIGS. 1 and 2, the shopping cart 10 comprises, among other conventional components, a frame 20, which includes upright members 22, 24, 26, a transverse handle 30, which is mounted to the frame20, and a gate 40, which is mounted pivotally to the frame 20. As mounted pivotally to the frame 20, the gate 40 is pivotable between a lowered position, in which the gate 40 is illustrated in FIG. 1, and an elevated position, in which the gate 40 is illustrated in FIG. 2.

In the lowered position, the gate 40 and other movable structures of the shopping cart 10 define a child seat 50. In the elevated position, the gate 40 and other movable structures of the shopping cart 10 are moved so as to enable a similar cart, such as the similar cart 10' illustrated in broken lines in FIG. 2, to nest into the shopping cart 10.

As illustrated in FIGS. 1 and 2, the cupholder 100 comprises a cup-holding body 110, which is mounted to the gate 40 so that the cup-holding body 110 projects into the shopping cart 10, where the child seat 50 is defined, in the lowered position of the gate 40. The cup-holding body 110 is made from a rubbery material (e.g., Monoprene™ rubber molding compound) enabling the cup-holding body to collapse to a collapsed condition, in which the cup-holding body 110, if empty, does not prevent nesting of the similar cart 10' into the shopping cart 10, and enabling the cup-holding body 110 to return to an uncollapsed condition, in which the cup-holding body 110 can hold a cup, such as the cup C illustrated in broken lines in FIG. 1.

Figure 4:
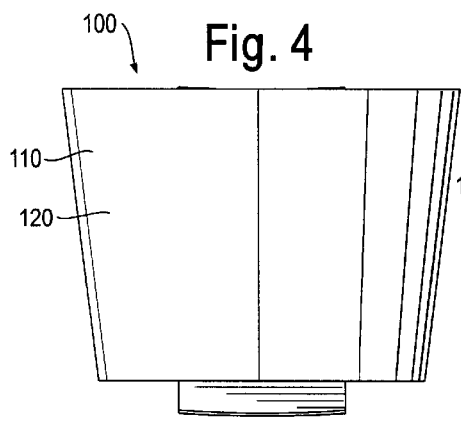
Figure 5:
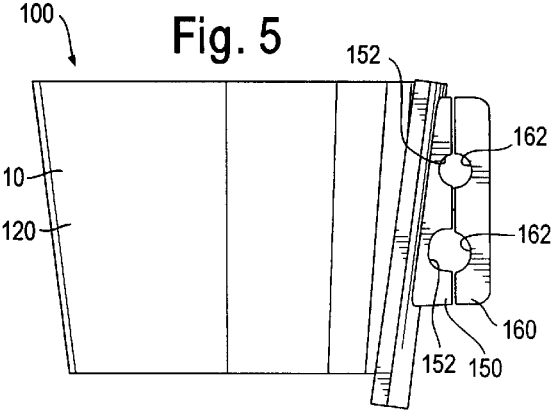
Figure 6:
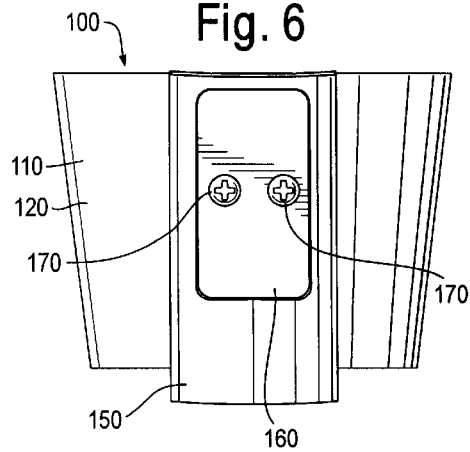
Figure 7:
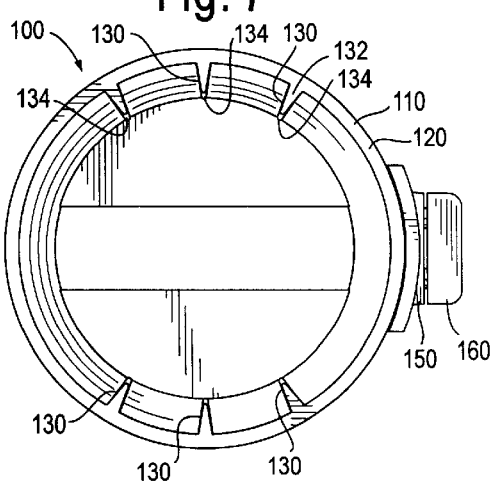

As illustrated in FIGS. 3 through 7, the cup-holding body 110 has a lateral wall 120, which can assume a frusto-conical shape when not collapsed. The lateral wall 120 has two sets of fins 130, three fins 130 in each set, which project inwardly from the lateral wall 120 so as to be diametrically opposed when the lateral wall 120 assumes the frusto-conical shape. Each fin 130 has an upper end 132 and a lower end 134 and tapers between the upper end 132, which projects more from the lateral wall 120, and the lower end 134, which projects less from the lateral wall 120. Moreover, the cup-holding body 110 has two partial, lower walls 140 spaced from each other by a gap 150, which facilitates collapsing of the cup-holding body 110 and through which any spilled contents can drain from the cup-holding body 110. Each partial, lower wall 140 is disposed below a respective one of the two sets of fins 130.

As illustrated in FIGS. 1 and 2, the gate 40 comprises two upper, horizontal wires 42. As illustrated therein and in FIGS. 3, 5, and 6, the cupholder 100 further comprises a rigid part 150, which is affixed to the lateral wall 120 of the cup-holding body 110, which is positioned on a given side of those wires 42, and which has two recesses 152 accommodating those wires 42, a rigid part 160, which is positioned on an opposite side of those wires 42 and which has two recesses 162 accommodating those wires 42, and two pan screws 170, which are employed for fastening the rigid parts 150, 160, to each other with those wires 42 clamped between the rigid parts 150, 160, within the recesses 152, 162. Preferably, the rigid parts 150, 160, are made from a suitably rigid engineering polymer, e.g., polypropylene.

What is claimed is:

1. A shopping cart equipped with a cupholder and comprising structures movable between a first set of relative positions, in which a child seat is defined, and a second set of relative positions, in which the shopping cart is adapted to receive a nesting cart, the movable structures comprising a gate pivotable between a lowered position, in which the gate is positioned in the first set of relative positions of the movable structures, and an elevated position, in which the gate is positioned in the second set of relative positions of the movable structures, wherein the cupholder comprises a cup-holding body mounted to one of the movable structures so that the cup-holding body projects into the shopping cart, where the child seat is defined, in the first set of relative positions of the movable structures, and wherein the cup-holding body is made from a rubbery material enabling the cup-holding body to collapse to a collapsed condition, in which the cup-holding body, if empty, does not prevent nesting of a similar cart into the shopping cart equipped with the cupholder, and enabling the cup-holding body to return to an uncollapsed condition, in which the cup-holding body can hold a cup.

2. The shopping cart of claim 1 wherein the movable structures comprise a gate pivotable between a lowered position, in which the gate is positioned in the first set of relative positions of the movable structures, and an elevated position, in which the gate is positioned in the second set of relative positions of the movable structures, and wherein the cup-holding body is mounted to the gate.

3. The shopping cart of claim 1 wherein the cup-holding body has a lateral wall, which can assume a frusto-conical shape when not collapsed and which has fins projecting inwardly from the lateral wall.

4. The shopping cart of claim 2 wherein the cup-holding body has a lateral wall, which can assume a frusto-conical shape when not collapsed and which has fins projecting inwardly from the lateral wall.

5. The shopping cart of claim 1 wherein the cup-holding body has a lateral wall, which can assume a frusto-conical shape when not collapsed and which has two sets of fins projecting inwardly from the lateral wall so as to be diametrically opposed when the lateral wall assumes the frusto-conical shape.

6. The shopping cart of claim 5 wherein each fin has an upper end and a lower end and tapers between the upper end, which projects more from the lateral wall, and the lower end, which projects less from the lateral wall.

7. The shopping cart of claim 2 wherein the cup-holding body has a lateral wall, which can assume a frusto-conical shape when not collapsed and which has two sets of fins projecting inwardly from the lateral wall so as to be diametrically opposed when the lateral wall assumes the frusto-conical shape.

8. The shopping cart of claim 7 wherein each fin has an upper end and a lower end and tapers between the upper end, which projects more from the lateral wall, and the lower end, which projects less from the lateral wall.

9. The shopping cart of claim 1 wherein the cup-holding body has two partial, lower walls spaced from each other by a gap, which facilitates collapsing of the cup-holding body and through which any spilled contents can drain from the cup-holding body.

10. The shopping cart of claim 2 wherein the cup-holding body has two partial, lower walls spaced from each other by a gap, which facilitates collapsing of the cup-holding body and through which any spilled contents can drain from the cup-holding body.

11. The shopping cart of claim 1 wherein the structure mounting the cupholder comprises horizontal wires and wherein the cupholder further comprises a rigid part affixed to the lateral wall of the cup-holding body and positioned on a given side of said wires, a rigid part positioned on an opposite side of said wires, and means for fastening the rigid parts to each other with said wires clamped between the rigid parts.

12. The shopping cart of claim 11 wherein at least one of the rigid parts is recessed so as to accommodate said wires.

13. The shopping cart of claim 11 wherein both of the rigid parts are recessed so as to accommodate said wires.

14. The shopping cart of claim 2 wherein the gate comprises horizontal wires and wherein the cupholder further comprises a rigid part affixed to the lateral wall of the cup-holding body and positioned on a given side of said wires, a rigid part positioned on an opposite side of said wires, and means for fastening the rigid parts to each other with said wires clamped between the rigid parts.

15. The shopping cart of claim 14 wherein at least one of the rigid parts is recessed so as to accommodate said wires.

16. The shopping cart of claim 14 wherein both of the rigid parts are recessed so as to accommodate said wires.

17. For use with a shopping cart comprising structures movable between a first set of relative positions, in which a child seat is defined, and a second set of relative positions, in which the shopping cart is adapted to receive a nesting cart, the movable structures comprising a gate pivotable between a lowered position, in which the gate is positioned in the first set of relative positions of the movable structures, and an elevated position, in which the gate is positioned in the second set of relative positions of the movable structures, a cupholder comprising a cup-holding body mountable to one of the movable structures so that the cup-holding body projects into the shopping cart, where the child seat is defined, in the first set of relative positions of the movable structures, and wherein the cup-holding body is made from a rubbery material enabling the cup-holding body to collapse to a collapsed condition, in which the cup-holding body, if empty, does not prevent nesting of a similar cart into the shopping cart equipped with the cupholder, and enabling the cup-holding body to return to an uncollapsed condition, in which the cup-holding body can hold a cup.

18. The cupholder of claim 17 wherein the cup-holding body has a lateral wall, which can assume a frusto-conical shape when not collapsed and which has fins projecting inwardly from the lateral wall.

19. The cupholder of claim 17 wherein the cup-holding body has a lateral wall, which can assume a frusto-conical shape when not collapsed and which has two sets of fins projecting inwardly from the lateral wall so as to be diametrically opposed when the lateral wall assumes the frusto-conical shape.

20. The cupholder of claim 19 wherein each fin has an upper end and a lower end and tapers between the upper end, which projects more from the lateral wall, and the lower end, which projects less from the lateral wall.

\* \* \* \* \*